United States Patent [19]

Howard et al.

[11] Patent Number: 4,947,068

[45] Date of Patent: Aug. 7, 1990

[54] MOTOR FOR WHIRLPOOL BATHS

[75] Inventors: Dennis Howard; Raymond D. Heilman, both of Florissant, Mo.

[73] Assignee: Emerson Electric Co., St. Louis, Mo.

[21] Appl. No.: 331,619

[22] Filed: Mar. 30, 1989

[51] Int. Cl.⁵ .......................... H02K 11/00; H02J 1/00
[52] U.S. Cl. ........................................ 310/71; 239/61; 310/68 A; 310/89
[58] Field of Search ............. 128/66; 200/81 H, 83 Z; 239/61; 310/71, 89, 91, 68 A

[56] References Cited

U.S. PATENT DOCUMENTS

| | | | |
|---|---|---|---|
| 4,482,847 | 11/1984 | Rudlich, Jr. et al. | 318/9 |
| 4,517,481 | 5/1985 | Breining | 310/89 |
| 4,647,738 | 3/1987 | Diamond | 200/81 H |
| 4,668,847 | 5/1987 | Greene | 200/81 H |
| 4,791,329 | 12/1988 | Ubukata et al. | 310/89 |
| 4,808,865 | 2/1989 | King | 310/71 |
| 4,823,413 | 4/1989 | Chalberg et al. | 239/61 |

Primary Examiner—Mark O. Budd
Assistant Examiner—D. L. Rebsch
Attorney, Agent, or Firm—Polster, Polster and Lucchesi

[57] ABSTRACT

A dynamoelectric machine in the form of an electric motor which can be easily converted between normal motor operation and remote actuation through a simple conversion device. The conversion device includes a remotely located on/off actuator for operating a switch attached to the motor. The switch is mounted to the motor through a simple bracket arrangement, and jumper wires are used to permit the switch element is be interposed in the electrical circuit of the motor without special tools by regular field personnel.

2 Claims, 1 Drawing Sheet

MOTOR FOR WHIRLPOOL BATHS

BACKGROUND OF THE INVENTION

This invention relates to dynamoelectric machines, and in particular to a device for permitting the conversion of an electric motor to remote operation. While the invention is described in particular with respect to its application in whirlpool bath systems, those skilled in the art will recognize the wider applicability of the inventive construction described hereinafter.

Dynamoelectric machines, in the form of conventional induction motors, find wide applicational use in pumps for a number of purposes. One such purpose is in pumps utilized with whirlpool baths or spas which recently have become popular. Such whirlpool baths or spas often are sold with a variety of options. One such option is a pneumatic on/off switch mounted to the tub or spa which controls motor and pump operation. Generally, the motor and its associated water pump are located at one location, while the actuator control for remote operation is located at the whirlpool bath or spa. For example, the actuator may be located along the side of the tub so as to be within easy reach of the tub occupant.

Often, however, remote operation is not desired or the option is not chosen by the customer. In the past, two different motor models have been required to meet this kind of demand. That is to say, one motor type was provided for tubs or spas not desiring remote operation, while a second motor type was provided those installations where remote switch operation was desired. This dual requirement represents a problem for motor manufacturers and Original Equipment Manufacturers (OEMs) who assemble the whirlpool bath systems. Because of different types of systems which can be assembled, a variety of horsepower ratings for motors can be used. Where various sized motors are used, two models in each size previously have been required. As will be appreciated, even when a single size is employed by an OEM, two motor models were required and motor and switch installation were often so complicated as to require factory installation. These problems represent increased costs for both the motor manufacturer and the OEM, clearly impacting inventory cost control and installation costs.

One of the objects of the present invention is to provide an electric motor which can be easily converted to remote operation.

Another object of this invention is to provide an electric motor for use in whirlpool bath systems or spas, which motor can be converted to remote use by field personnel.

Another object of this invention is to provide a low cost assembly for providing remote operation of any dynamoelectric machine.

Still another object of this invention is to provide ease of access to motor components for converting the motor to remote switch operation.

Other objects of this invention will be apparent to those skilled in the art in light of the following description and accompanying drawings.

SUMMARY OF THE INVENTION

In accordance with this invention, generally stated, a conversion device is provided for mounting an optional switch to a dynamoelectric machine in the form of an induction motor. The motor includes a stator assembly, a rotor assembly and an enclosure. End shields are mounted on each end of the enclosure and the rotor assembly is mounted for rotation along the end shields. An outer face of one end shield is formed to provide mounting systems for a plurality of motor system components. Preferably, the end shield provides mounting for an associated motor terminal board, an electrical protector, and an optional mounting for a switch assembly which may be remotely actuated. A cover assembly normally encloses the mounting areas. The cover assembly includes an access opening for installing the mechanism for remotely operating the switch.

BRIEF DESCRIPTION OF THE DRAWINGS

In the drawings.

FIG. 3 is diagrammatic view of the electric motor shown in FIG. 1 in its non-remote operated condition; and FIG. 4 is a diagrammatic view of the motor shown in FIG. 1 in its remotely operated connection;

FIG. 5 is a view in side elevation of the motor of this invention; and

FIG. 6 is a view in end elevation showing the connection scheme of the present invention.

DESCRIPTION OF THE PREFERRED EMBODIMENT

Figure 1:
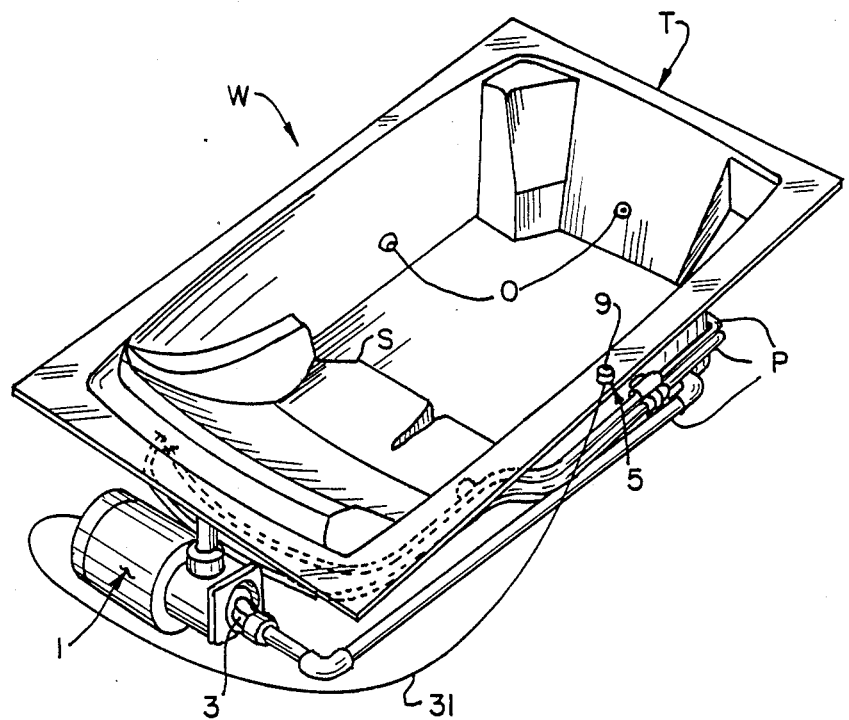
FIG. 1 is a perspective view of a whirlpool bath employing one illustrative embodiment of the dynamoelectric machine of the present invention.

Referring now to FIG. 1, reference numeral 1 indicates one illustrative embodiment of the motor of this invention employed in a whirlpool bath indicated generally at W. The bath W includes a tub T which is constructed according to principles generally known in the art. The tub T may include a seat S for individuals to sit upon while enjoying a whirlpool bath. In addition, a plurality of water and air outlets 0 are located in the sides of the tub for water, under pressure, to be injected into the tub to create the whirlpool effect. Water and air is directed to these outlets via water pipes P, illustrative examples of which are shown in FIG. 1. The construction of the whirlpool bath W, and its related outlets and pipe routing form no part of this invention.

The motor 1 is used to drive a pump 3 for creating the water flow directed to the tub T. Motor 1 typically is relatively compact in size to fit within the small space available beneath the tub for installation. As shown in FIG. 1, the motor 1 may be controlled, where desired, by the occupant of the tub via a remotely located on/off switch indicated generally at 5. The switch 5 may be placed in one of the sides of the tub T, as shown in FIG. 1, for example. When a remote switch is present, the occupant may control the motor remotely to turn the pump on and off, and hence control the whirlpool action of the tub from the tub itself. Alternately, the motor 3 is controlled by a conventional on/off switch at or near the motor 3 which is actuated before the user enters the tub. That switch is turned off by the user after leaving the tub. Conventionally, this second switch is a more conventional electric switch, while the remotely actuated switch 5 is a pneumatic switch.

As indicated above, in the past whirlpool bath OEMs had to stock two motor types. One motor type was used in the conventional electrical switch environment, while the other motor type was used with the remotely located air activated switch such as switch 5. OEMs consequently incurred added expense by having to stock different motor types. The present invention allows manufacturers to use a single motor type for either type of installation. The motor is intended to be supplied with a motor mounted or motor associated conventional electrical switch, or to be convertible to use with a remotely located on/off pneumatic switch, such as switch 5, by field personnel.

Figure 2:
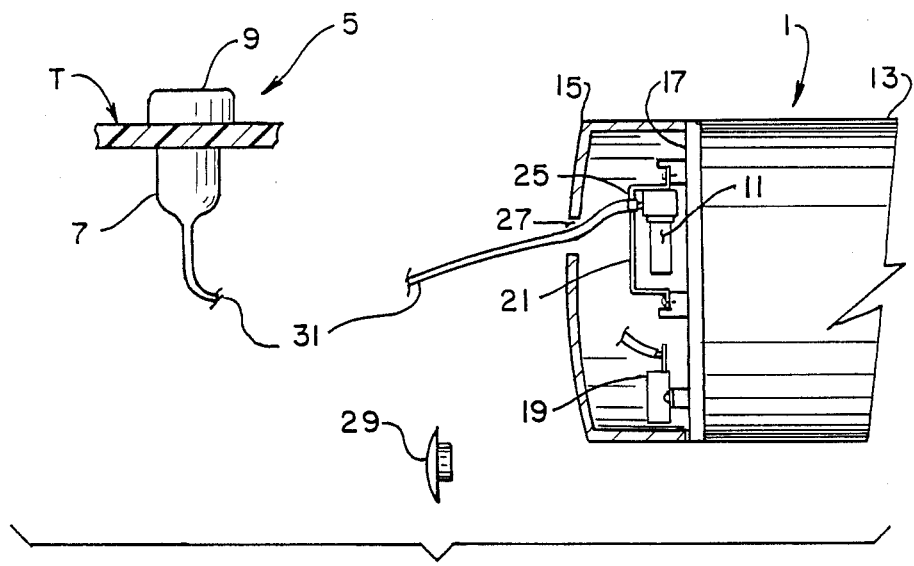
FIG. 2 is a diagrammatic view in side elevation, partly in section and partly broken away, showing the motor and an air switch of the present invention.

As shown in FIGS. 1 and 2, remotely located switch 5 includes an actuator button or plunger 9 for producing air pressure changes in a chamber 7. The chamber 7 is connected through a pneumatic line 31 to an electrical switch element 21 for operating the motor 1 as described hereinafter.

Referring now to FIG. 5, the motor 1 includes a stator assembly 100, and a rotor assembly 101 which are housed within a shell 102.

The stator assembly 100 is conventional, and generally includes a plurality of windings generally indicated by the reference numeral 150, and described in greater detail hereinafter. The rotor assembly 101 includes a rotor 103 mounted to a shaft 104. The shaft 104 extends outwardly from the motor 1 on at least one end thereof, and drives the pump 3 in a conventional manner. The rotor 103 is journaled for rotation along a pair of end shields 105 and 106 respectively.

The end shield 105 is conventional and is not described in detail. The end shield 106, as shown in FIGS. 5 and 6, is closed by a removable closure or cover assembly 110. The end shield 105 and the closure 110 delimit a mounting area 120. In the embodiment illustrated, the mounting area 120 is designed to provide mounting means for a terminal board 19, a motor protector 57 and the element 21 of switch 5. Power leads for the motor 1 are connected through an opening 151.

Terminal board 19 and its associated centrifugal actuator 51, and the protector 57 are conventional and their operation and construction are not described in detail except as provided hereinafter.

The end shield 106, however, does include a pair of mounting bosses 121 and 122 respectively. The bosses 121 and 122 hold a bracket 25 in a conventional manner. Threaded fasteners work well as attachment means, for example. The bracket 25 has the element 21 attached to it. Element 21 includes a switch holder 125 having the air line 31 connected to it. The holder 125 operatively connects the line 31 and an air operated electrical switch 127.

Referring to FIG. 3, the windings 150 of stator assembly 100 of motor 1 include specifically main windings 33 and 35 and an auxiliary winding 37. While shown as unitary coils, those skilled in the art recognize that the respective windings may be formed in coil sets defining electrical poles in accordance with conventional motor design procedure. In any event, one end of each of the windings 33, 35 and 37 are commonly connected to a terminal 39 by a jumper wire 41. The terminal 39 is mounted on the terminal board 19 in a conventional manner.

The second end of windings 33 and 35 are commonly connected to a terminal 43 by a connection wire 45. The second end of winding 37 is connected to a terminal 47 by a connector wire 49. Terminals 43 and 47 are connected to one another through connection wires 53 and 55 respectively via a centrifugal actuator 51. The protector 57 is connected to a terminal 59 by a connection wire 63. A second end of protector 57 is connected to a terminal 61 by a jumper wire 65. Terminal 61 is attached to terminal 39 by a connection wire 67. External power lines are connected to the respective terminals 59 and 43. During normal operation, both the main and auxiliary windings are connected to the motor line leads. As the motor comes to speed, the centrifugal actuator 51 opens, removing the auxiliary winding 37 from the motor circuit. Operation of the centrifugal actuator is conventional, and is described, for example, in U.S. Pat. No. 4,034,173, the disclosure of which is intended to be incorporated herein by reference. The protector 57 acts as a current and a thermal overload protector for the motor windings, and essentially provides an open circuit to the windings, should improper operation occur.

The ease of motor operation provided by the present invention is demonstrated with reference to FIG. 4. When element 21 is installed as described in connection with FIGS. 5 and 6, it may be inserted in the motor circuit simply. That connection is accomplished by removing jumper wire 65 from terminal 61 and connecting it to a terminal 23 of switch element 21. Likewise, jumper wire 41 is removed from terminal 39 and connected to a terminal 23a of the element 21. Thereafter, closure of the switch 5 connects one side of the line connected at the terminal 59 through the switch element 21 to one side of the motor windings. The second side of the main windings 33 and 35 still remains connected to the terminal 43 while the second side of the auxiliary winding 37 is connected through the centrifugal actuator switch 51 to the terminal 43. In this configuration, remote operation of the motor 1 is provided simply and economically. As shown diagrammatically in FIG. 2, the cover 110 has an opening 27 in it, which is closed, after manufacture, by a plug 29. When remote operation is desired, the plug 29 is removed so that one end of the tube 31 can be attached to an appropriate fitting on the switch element 21. As indicated, the other end of tube 31 fits onto the end of the chamber 7. The tube transmits air pressure changes from chamber 7 to the element 21 to cycle the switch on and off.

The simple installation of the switch assembly, and the ease of connection of those parts can be accomplished easily by removing the cover 110. After installation of the switch on the bosses 121 and 122, the electrical connections are made and the cover 110 is replaced. The motor is then ready for operation with remote actuation in the pneumatic switch 5.

It should be obvious to those skilled in the art that many variations of the present invention as disclosed and claimed herein are possible without departing from the scope of the appended claims. Merely by way of example, the placement of parts within the connection area may be varied in other embodiments of this invention. Likewise, specific configurations of the end shields 105 and 106 may be altered. While a split phase motor is shown and described in the drawings, other motor types may be employed with the invention disclosed with our invention. These variations are merely illustrative.

Having thus described the invention, what is claimed and desired to be secured by Letters Patent is:

1. A dynamoelectric machine for driving a water pump used with a whirlpool bath to inject water, under pressure, into the bath, the machine having a housing including an end shield, windings comprising a stator and electrical terminals for interconnecting the windings with an external power source, and the whirlpool bath including an air activated on/off switch for energizing the dynamoelectric machine, a manually operable plunger proximally located to the bath and tubing extending between the plunger and the switch to transmit air pressure changes from the plunger to the switch to operate the switch, means for selectively interconnecting said on/off switch with said dynamoelectric machine, the housing having a detachable cover for exposing the end shield, and said interconnecting means including a bracket for attaching a switch element of the electric switch adjacent to the end shield when the cover is removed, means for admitting the tubing into the housing for interconnection with the switch element, said cover having an opening therein and the admitting means including a plug for the opening, said plug normally closing the opening but being removable to allow the tubing to be inserted through the opening and connected to the switch element, and jumper means for changing electrical connections inside the housing between the stator windings and the external power source to accommodate the on/off switch in the circuit formed by the windings and the external power source, the jumper means including jumper wires interconnecting electrical terminals within the housing by which a circuit is formed between the stator windings and the external power source, said jumpers being routable to reconfigure the circuit to include the switch element.

2. The dynamoelectric machine of claim 1 which comprises an electric motor.

* * * * *